March 19, 1935.  B. E. O'HAGAN  1,994,589
GROUND DETECTING APPARATUS
Filed June 2, 1932
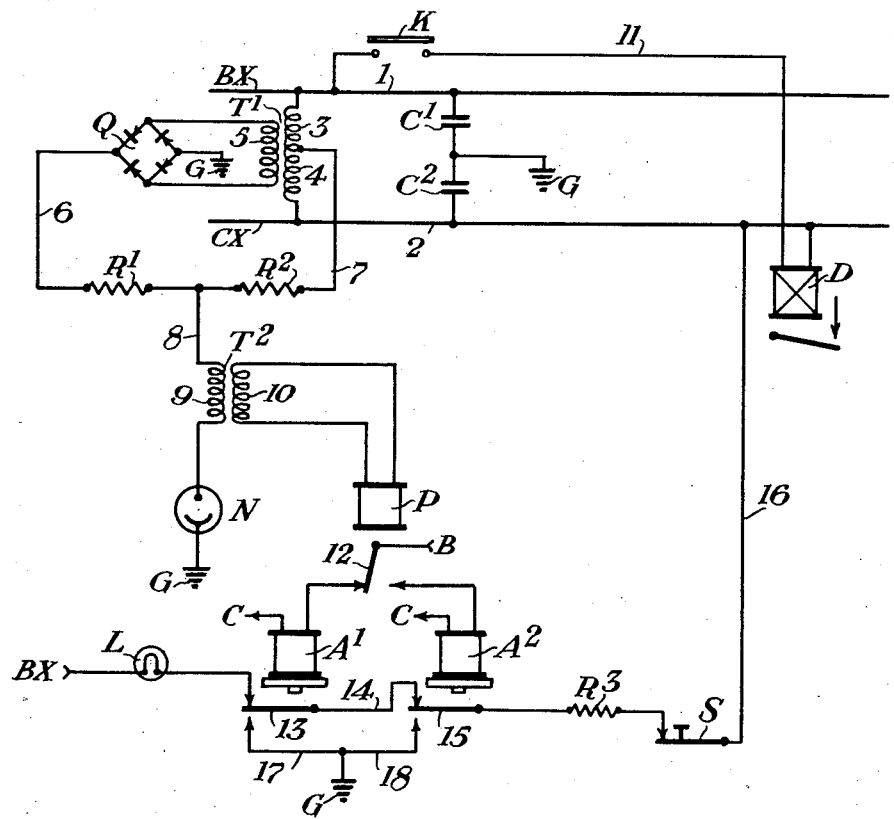
INVENTOR.
*Bernard E. O'Hagan.*
BY
HIS ATTORNEY.

Patented Mar. 19, 1935

1,994,589

UNITED STATES PATENT OFFICE 1,994,589

GROUND DETECTING APPARATUS

Bernard E. O'Hagan, Swissvale, Pa., assignor to The Union Switch & Signal Company, Swissvale, Pa., a corporation of Pennsylvania Application June 2, 1932, Serial No. 615,010

5 Claims. (Cl. 177—311)

My invention relates to ground detecting apparatus and more specifically to apparatus for the detection of grounds in an alternating current transmission system.

I will describe one form of ground detecting apparatus embodying my invention, and will then point out the novel features thereof in claims.

The accompanying drawing is a diagrammatic view showing one form of apparatus embodying my invention.

In signaling systems using alternating current, particularly where the transmission wires are carried in cable, there may exist large electrostatic capacities to ground from the various wires of the supply system as well as from the control wires for any relays connected with the system. These capacities may be of such magnitude that in the event of a ground occurring on a control wire of a relay the relay may falsely pick up or fail to release due to energy which it may receive through the capacity and ground in series, even though the operating circuit for such relay be open at the relay controlling device. Since the relay may control an important signal or switch function, it is essential that the above source of false energization be rendered ineffective. My invention provides a method for indicating the presence of grounds of such magnitude as might create a dangerous condition and for by-passing undesired current away from any control relays in the event of dangerous grounds, thus protecting the control relays against false operation.

Referring to the drawing, the reference characters 1 and 2 designate two wires of an alternating current transmission system which are supplied from a source not shown in the drawing. One terminal of a control relay D is shown permanently connected with wire 2 of the system, the other terminal of the relay being connected with wire 1 by means of wire 11 and the normally open controller K. It will be understood that when it is desired to operate relay D, controller K will be closed, governing means for controller K being not shown for simplicity. The distributed capacity from wires 1 and 2 to ground as well as from any control wires connected therewith is represented by the capacities $C^1$ and $C^2$.

The reference character $T^1$ designates a transformer the primary of which is connected between wires 1 and 2 and the secondary winding 5 of which supplies alternating current to the two diagonally opposite alternating current terminals of a full wave rectifier Q. One of the direct current terminals of rectifier Q is permanently connected with ground, the other terminal being connected to the mid point of the primary winding of transformer $T^1$ through a charging resistor $R^1$ and a discharge resistor $R^2$. The charging resistor $R^1$ is of considerably greater magnitude than the discharge resistor $R^2$ for the purpose of providing a relatively long charging time as compared with a relatively short discharge time.

The circuit so far described provides a method for charging capacities $C^1$ and $C^2$ to the potential existing across the output terminals of rectifier Q. One terminal of the primary winding 9 of a transformer $T^2$ is connected to the junction point of resistors $R^1$ and $R^2$, the other terminal being connected to one element of a glow tube N, the other element of the glow tube being connected to ground. The glow tube N is filled with a gas such as neon, for example, and has a critical discharge voltage as well as a critical cut-off voltage. The secondary winding 10 of transformer $T^2$ is connected to the terminals of a polarized relay P which controls a polar contact 12 which, in turn, controls the energization of two slow-acting relays $A^1$ and $A^2$. Contact 12 of relay P is arranged to remain closed in its last-operated position.

In normal operation, with no grounds existing on the line wires, as soon as the potential across capacities $C^1$ and $C^2$ reaches the critical discharge value of tube N, a discharge path will become established through tube N to ground. As soon as tube N breaks down, the current which passes through it to ground will come principally from the energy stored in the two capacities $C^1$ and $C^2$ since the charging resistance $R^1$ is sufficiently high to prevent any appreciable flow of current from rectifier Q under this condition. This discharge of current will cause a flux to be set up by primary winding 9, causing a voltage to be induced in a given direction in secondary winding 10, thereby actuating relay P and reversing contact 12. As soon as the potential across capacities $C^1$ and $C^2$ is decreased below the critical cut-off potential of tube N, the discharge current will be interrupted and the flux set up by winding 9 of transformer $T^2$ will collapse, causing a secondary voltage to be induced in winding 10 in the opposite direction. Relay P will therefore become pole-changed, restoring contact 12 to the position illustrated.

It will be apparent from the foregoing that as long as power wires 1 and 2 are energized and capacities $C^1$ and $C^2$ remain intact, relay P will continue to operate at a rate determined by the characteristics of tube N and the values of resistors $R^1$ and $R^2$. Another reason for making the resistance of $R^1$ large, is to insure that once a discharge has taken place through tube N, the discharge current will not be maintained by rectifier Q passing current through resistor $R^1$ and winding 9 of transformer $T^2$ after the potential across capacities $C^1$ and $C^2$ has collapsed below the cut-off potential of tube N. The releasing time of relays $A^1$ and $A^2$ is made sufficiently long to bridge the reversal period of relay P. Therefore, as long as relay P continues to operate as above, front contacts 13 and 15 of relays $A^1$ and $A^2$ respectively will remain closed, energizing indicator L over a circuit which includes the grounding resistor $R^3$ and the push button S, thus providing information to the operator that the transmission system is free from grounds.

Should a ground occur on either of the transmission wires 1 or 2 or on control wire 11, both capacities $C^1$ and $C^2$ will become effectively short-circuited through the resistance of the ground, whereby it will become impossible to build up a potential across either of these capacities of sufficient magnitude to break down the resistance of glow tube N. When this occurs, relay P will cease to operate and one or the other of relays $A^1$ or $A^2$ will become released, deenergizing indicator L and closing a protective circuit from wire 2 through resistor $R^3$ to ground. The purpose of the protective circuit is to by-pass a sufficient amount of current away from relay D to prevent possible energization of this relay during the existence of the accidental ground. After the ground has been located and removed, the system can be restored to normal operation by depressing push button S momentarily, interrupting the ground circuit through resistor $R^3$ and making it again possible for capacities $C^1$ and $C^2$ to become charged. Although I have shown slow-acting relays such as $A^1$ and $A^2$ controlled by the contact 12 of relay P, it will be apparent that any device responsive to the continued oscillating movement of contact 12 could be used as well to accomplish a similar result. Also the protective apparatus disclosed can be employed for the detection of grounds on transmission systems having a number of line wires different from that illustrated, and is of particular utility in detecting grounds on those wires of a system which have zero alternating current potential to ground, since ordinary methods of ground detection fail with respect to such wires.

One advantage in using transformer $T^1$ and rectifier Q as a source of potential for charging capacities $C^1$ and $C^2$, in preference to an independent direct current source, is that should either of windings 3 or 4 become disconnected from wires 1 or 2, relay P will cease to operate, deenergizing indicator L. However, in the case of an independent source, under the same condition, a potential would still be available for charging one or the other of capacities $C^1$ or $C^2$, so that relay P might continue to function in spite of a ground occurring on the line wire associated with the broken connection, thus giving no warning of the fault.

Although I have herein shown and described only one form of ground detecting apparatus embodying my invention, it is understood that various changes and modifications may be made therein within the scope of the appended claims without departing from the spirit and scope of my invention.

Having thus described my invention, what I claim is:

1. In combination with an alternating current transmission line having capacity to ground, means for supplying unidirectional current to said line for charging said capacity, a discharge device having a critical break-down potential, and means including said device for causing a discharge from said capacity when the potential across the capacity reaches the break-down potential of said device, and indicating means energized by the discharge from said capacity.

2. In combination with an alternating current transmission line having capacity to ground, a first circuit for supplying unidirectional current to said line for charging said capacity, a discharge device having a critical break-down potential as well as a critical cut-off potential; a second circuit including said device for causing a discharge from said capacity when the potential across the capacity reaches a first value determined by said break-down potential, said discharge continuing until the potential across the capacity decreases to a second value determined by said cut-off potential, said two circuits being so arranged that said charge and discharge operations will repeat themselves automatically in continued sequence as long as said capacity remains intact; and indicating means energized by the discharge from said capacity.

3. In combination with an alternating current transmission line having capacity to ground, a transformer having a primary winding supplied with current from said transmission line, a rectifier having the secondary winding of said transformer connected across its input terminals and having one output terminal connected with ground and the other output terminal connected with said line through a first and a second resistor in series, a discharge device having a critical break-down potential one terminal of which is connected to the junction point of said first and said second resistors and the other terminal of which is connected to ground whereby a discharge will occur from said capacity through said device when the potential across said capacity builds up to a value determined by said break-down potential, and indicating means energized by the discharge from said capacity.

4. In combination with an alternating current transmission line comprising a plurality of line wires having capacity to ground, a first circuit for supplying unidirectional current to said line for charging said capacity, a discharge device having a critical break-down potential as well as a critical cut-off potential, a second circuit including said device for causing a discharge from said capacity when the potential across said capacity builds up to a value determined by said break-down potential, said first circuit being so arranged that said capacity becomes automatically recharged following said discharge resulting in said charge and discharge operations following each other in continued sequence as long as none of said transmission wires is grounded, a control relay one terminal of which is at times connected with one wire of said line through a control wire and a circuit controller and the other terminal of which is constantly connected with another wire of said line, a detecting relay controlled by the energy discharged from said capacity in such manner that said detecting relay assumes a first condition when said charge and discharge impulses follow in sequence and another condition when said sequence is destroyed by the occurrence of a ground on a wire of said line, and means controlled by said detecting relay effective when said detecing relay assumes its second condition for connecting said other wire of said line with ground.

5. In a ground detecting system for an alternating current transmission line comprising a plurality of line wires having capacity to ground, a circuit for supplying unidirectional current to said line for charging said capacity from said source at a relatively slow rate, a glow tube having a critical break-down potential as well as a critical cut-off potential, a discharge circuit including said glow tube for causing a discharge from said capacity at a relatively rapid rate when the potential across said capacity reaches the break-down potential of said tube, and an indicator energized by the discharge from said capacity.

BERNARD E. O'HAGAN.